US012755976B2

(12) United States Patent
Kim et al.

(10) Patent No.: US 12,755,976 B2
(45) Date of Patent: Oct. 6, 2026

(54) BINDER SOLUTION FOR ALL-SOLID-STATE BATTERY AND ALL-SOLID-STATE BATTERY HAVING THE SAME AND HAVING UNIFORM BINDER DISTRIBUTION

(71) Applicants: HYUNDAI MOTOR COMPANY, Seoul (KR); KIA CORPORATION, Seoul (KR); Industry-Academic Cooperation Foundation, Yonsei University, Seoul (KR)

(72) Inventors: Sang Mo Kim, Hwaseong-si (KR); Sung Hoo Jung, Changwon-si (KR); Gyeong Jun Chung, Daejeon (KR); Yoon Jae Han, Uiwang-si (KR); Ju Yeon Lee, Busan (KR); Jong Jung Kim, Suwon-si (KR); Yoon Seok Jung, Seoul (KR); Kyu Tae Kim, Seoul (KR)

(73) Assignees: Hyundai Motor Company, Seoul (KR); Kia Corporation, Seoul (KR); INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 635 days.

(21) Appl. No.: 17/994,930

(22) Filed: Nov. 28, 2022

(65) Prior Publication Data

US 2023/0335739 A1 Oct. 19, 2023

(30) Foreign Application Priority Data

Apr. 14, 2022 (KR) ........................ 10-2022-0046033

(51) Int. Cl.
*H01M 10/0525* (2010.01)
*H01M 4/62* (2006.01)

(52) U.S. Cl.
CPC ........ *H01M 4/623* (2013.01); *H01M 10/0525* (2013.01)

(58) Field of Classification Search
CPC ..... H01M 4/62; H01M 4/623; H01M 10/0525
See application file for complete search history.

(56) References Cited

U.S. PATENT DOCUMENTS 10,916,775 B2 * 2/2021 Oura ..................... H01M 4/364
2015/0096169 A1 * 4/2015 Hasegawa ............. H01M 4/139 427/126.3

(Continued)

FOREIGN PATENT DOCUMENTS

CN 114256499 A * 3/2022 .......... H01M 10/052
JP 2010-537387 A 12/2010

(Continued)

OTHER PUBLICATIONS

S. Jaiser et al., "Investigation of film solidification and binder migration during drying of Li-Ion battery anodes," Journal of Power Sources, vol. 318, pp. 210-219, 2016.

(Continued)

*Primary Examiner* — Barbara L Gilliam
(74) *Attorney, Agent, or Firm* — Morgan Lewis & Bockius LLP

(57) ABSTRACT

The present disclosure relates to a binder solution for an all-solid-state battery and an all-solid-state battery comprising the same and having a uniform binder distribution. The binder solution may comprise: a binder including a fluorine-based polymer; a first solvent; and a second solvent. A Hansen solubility index difference value ($R_a$) between the fluorine-based polymer and the first solvent is about 10 or less, and a Hansen solubility index difference value ($R_a$) between the first solvent and the second solvent is about 7 or less.

9 Claims, 4 Drawing Sheets

(56) References Cited

U.S. PATENT DOCUMENTS

| | | | | |
|---|---|---|---|---|
| 2020/0136146 | A1 | 4/2020 | Hellring et al. | |
| 2020/0235420 | A1* | 7/2020 | Yushin | H01M 10/0565 |
| 2021/0057720 | A1 | 2/2021 | McKinney et al. | |
| 2021/0151762 | A1* | 5/2021 | Osada | H01M 4/62 |
| 2023/0275258 | A1* | 8/2023 | Finsy | H01M 10/056 429/316 |
| 2024/0120492 | A1* | 4/2024 | Shike | H01M 10/0562 |

FOREIGN PATENT DOCUMENTS

| | | | |
|---|---|---|---|
| JP | 2021-077591 | A | 5/2021 |
| KR | 10-2006-0119819 | A | 11/2006 |
| KR | 10-2007-0075185 | A | 7/2007 |
| KR | 10-2020-0020220 | A | 2/2020 |
| KR | 10-2020-0102613 | A | 9/2020 |

OTHER PUBLICATIONS

C. Hansen, “Hansen Solubility Parameters: A user’s handbook, Second Edition,” 2007.

* cited by examiner

[FIG. 1]
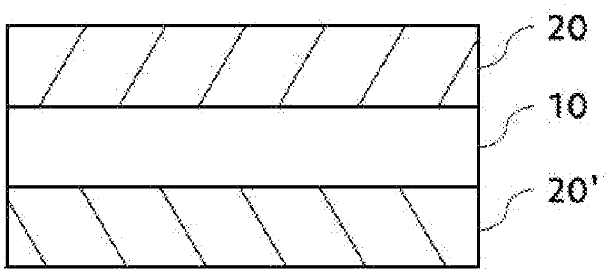
[FIG. 2A]
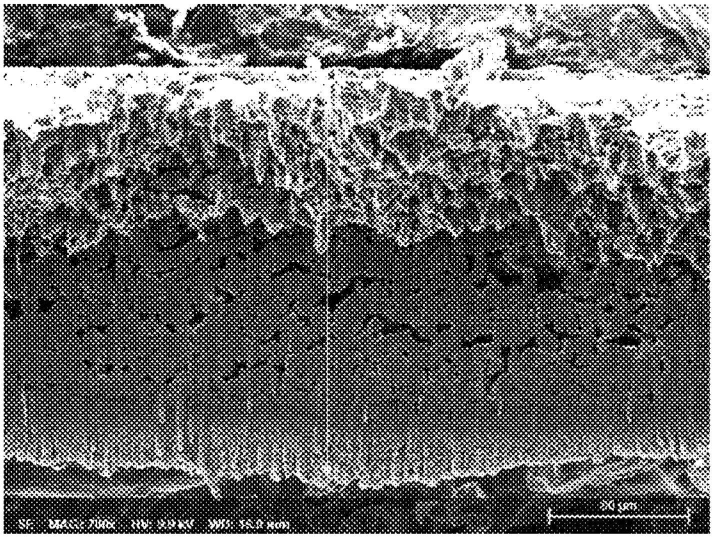
[FIG. 2B]
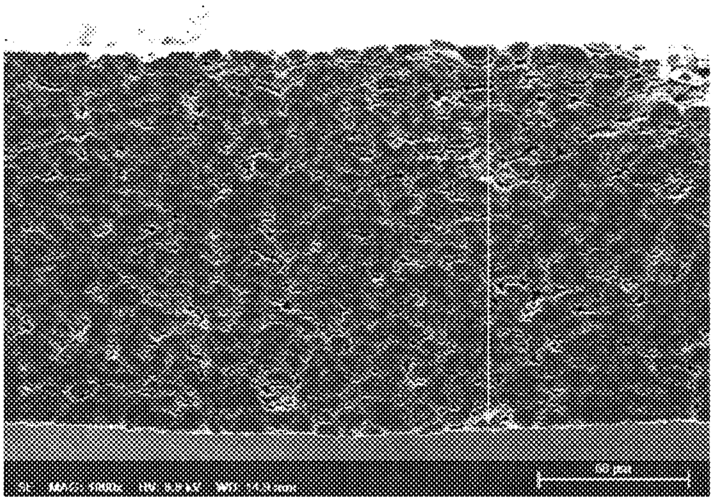

[FIG. 3A]
[FIG. 3B]
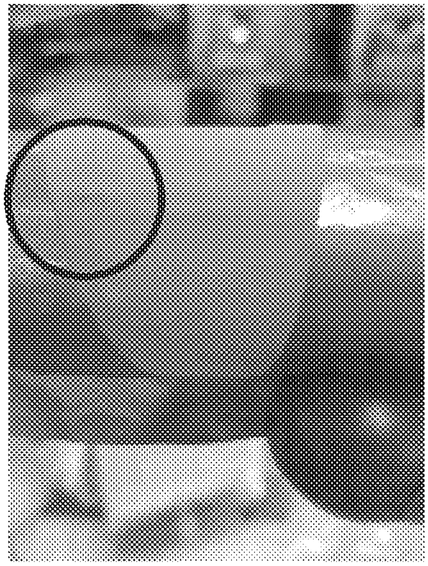

[FIG. 4A]
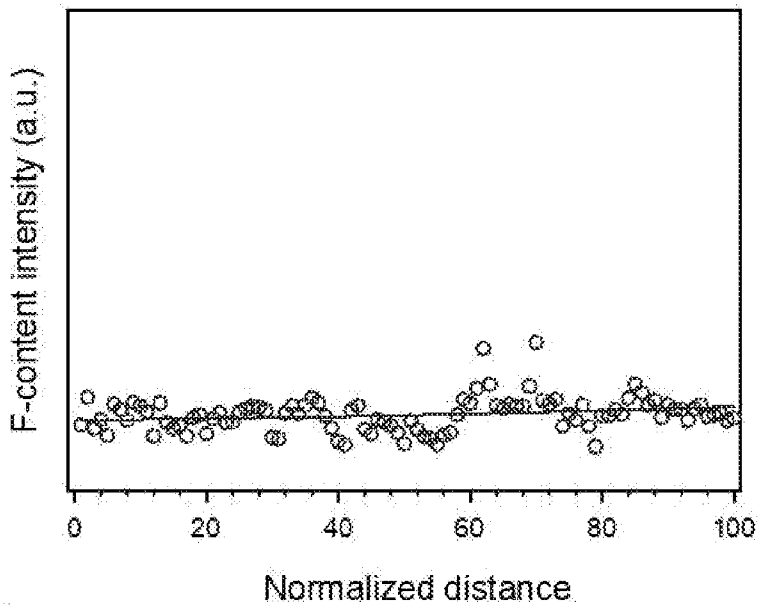
[FIG. 4B]
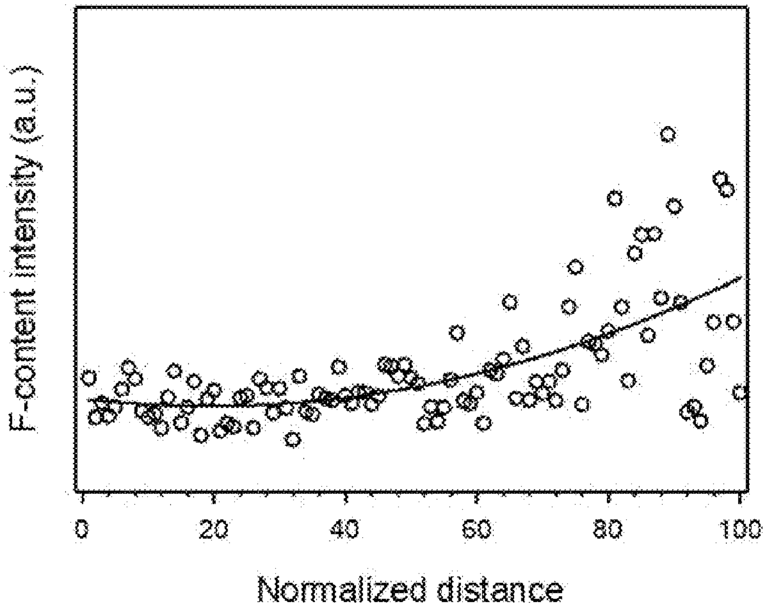

[FIG. 5]
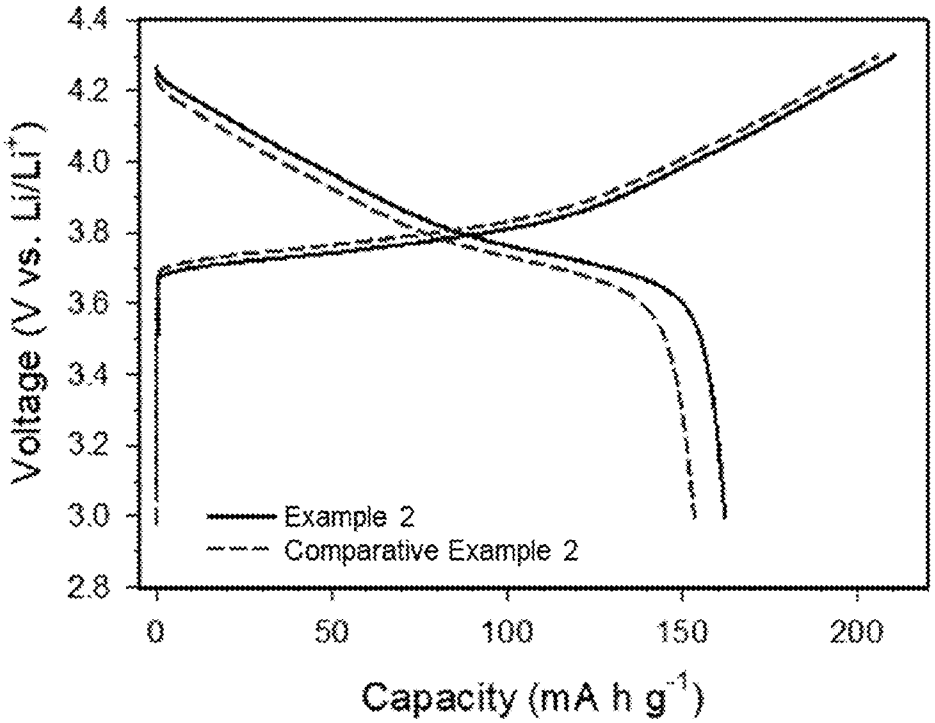
[FIG. 6]
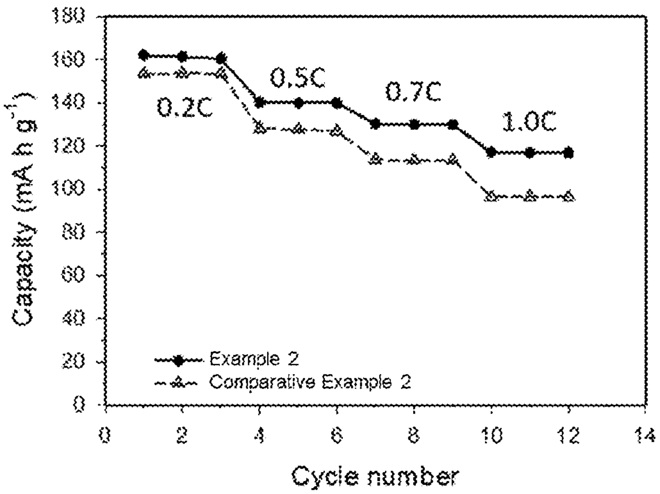

BINDER SOLUTION FOR ALL-SOLID-STATE BATTERY AND ALL-SOLID-STATE BATTERY HAVING THE SAME AND HAVING UNIFORM BINDER DISTRIBUTION

CROSS-REFERENCE TO RELATED APPLICATION

The present application claims the benefit of priority to Korean Patent Application No. 10-2022-0046033 filed on Apr. 14, 2022 in the Korean Intellectual Property Office, the entire contents of which are incorporated herein by reference.

TECHNICAL FIELD

The present disclosure relates to a binder solution for an all-solid-state battery and an all-solid-state battery having the same and having a uniform binder distribution.

BACKGROUND

Secondary batteries enabling charging and discharging are used not only in small electronic devices such as mobile phones and laptops, but also in large transportation means such as hybrid vehicles and electric vehicles. Accordingly, there is a need to develop secondary batteries having higher stability and energy density.

Conventional secondary batteries are mostly composed of cells based on organic solvents (organic liquid electrolytes) so that they have limitations in improving the stability and energy density.

Meanwhile, all-solid-state batteries using inorganic solid electrolytes have recently been in the spotlight since they are based on a technology that excludes organic solvents, and thus cells can be manufactured in a safer and simpler form.

Solid electrolytes are divided into oxide-based solid electrolytes and sulfide-based solid electrolytes. The sulfide-based solid electrolytes are mainly used since they have high lithium ion conductivity compared to the oxide-based solid electrolytes and are stable in a wide voltage range. However, the sulfide-based solid electrolytes have a disadvantage of low electrochemical stability.

Particularly, the electrode of the all-solid-state battery is manufactured by applying and drying a slurry including an electrode active material, a solid electrolyte, a conductive material, a binder, an organic solvent, etc., and there is a restriction that it can be used in only a non-polar or relatively weakly polar organic solvent considering the reactivity with the sulfide-based solid electrolyte.

Meanwhile, fluorine-based polymers have been widely used as binders for lithium-ion batteries due to their excellent electrochemical stability, but were not soluble in organic solvents having weak polarity so that they could not be applied to sulfide-based solid electrolyte based all-solid-state batteries.

Recently, research has been conducted to prepare a slurry for an electrode of an all-solid battery by dissolving a fluorine-based polymer in an organic solvent with a relatively weak polarity such as ethyl acetate, methyl isobutyl ketone or the like, or a solvent with a high boiling point, but there has been a limitation in manufacturing an electrode with a uniform binder distribution. The information disclosed in the Background section above is to aid in the understanding of the background of the present disclosure, and should not be taken as acknowledgement that this information forms any part of prior art.

SUMMARY OF THE DISCLOSURE

An object of the present disclosure is to provide an all-solid-state battery having a uniform distribution of a binder including a fluorine-based polymer.

The objects of the present disclosure are not limited to the object mentioned above. The objects of the present disclosure will become clearer from the following description, and will be realized by means and combinations thereof described in the claims.

A binder solution for an all-solid-state battery according to an embodiment of the present disclosure may comprise: a binder including a fluorine-based polymer; a first solvent; and a second solvent, wherein a Hansen solubility index difference value ($R_a$) between the fluorine-based polymer and the first solvent may be about 10 or less, and a Hansen solubility index difference value ($R_a$) between the first solvent and the second solvent may be about 9 or less.

The binder may include at least one of polyvinylidene fluoride (PVdF), poly(vinylidene fluoride-hexafluoropropylene) (PVdF-HFP), poly(vinylidene fluoride-trifluoroethylene) (PVdF-TrFE), poly(vinylidene fluoride-co-chlorotrifluoroethylene) (PVdF-CTFE), or any combination thereof.

A ratio (A/B) of a boiling point (A, [° C.]) of the first solvent at 760 mmHg to a vapor pressure (B, [mmHg]) of the first solvent at 25° C. may be about 1 or more and less than about 90.

A ratio (C/D) of a boiling point (C, [° C.]) of the second solvent at 760 mmHg to a vapor pressure (D, [mmHg]) of the second solvent at 25° C. may be about 90 or more and less than about 3,000.

The first solvent may include at least one of dibromomethane, ethyl acetate, methyl isobutyl ketone, ethyl formate, methyl acetate, methyl propionate, tetrahydrofuran, or any combination thereof.

The second solvent may include at least one of butyl butyrate, hexyl butyrate, benzyl acetate, pentyl butyrate, butyl benzoate, or any combination thereof.

The binder solution may include the first solvent in an amount of more than 0% by volume and about 50% by volume or less and the second solvent in an amount of about 50% by volume or more and less than 100% by volume based on the total volume of the first solvent and the second solvent.

The binder solution may include the binder in an amount of more than 0% by weight and less than about 20% by weight.

An all-solid-state battery according to an embodiment of the present disclosure may comprise a solid electrolyte layer and a pair of electrodes disposed on two opposing surfaces of the solid electrolyte layer, wherein at least one of the electrodes may include the binder solution.

A ratio (Q/P) of a fluorine content (Q) in a region corresponding to half the thickness of the electrode from one surface thereof to a fluorine content (P) in the remaining region may range from about 1.0 to 1.5.

According to the present disclosure, the all-solid-state battery having a uniform distribution of the binder including a fluorine-based polymer can be obtained.

According to the present disclosure, it is possible to obtain the all-solid-state battery that is not impaired in lithium ion conductivity and is electrochemically stable.

The effects of the present disclosure are not limited to the above-mentioned effects. It should be understood that the effects of the present disclosure include all effects that can be inferred from the following description.

BRIEF DESCRIPTION OF THE DRAWINGS

FIG. 1 shows an all-solid-state battery according to one exemplary embodiment of the present disclosure.

FIG. 2A shows a result of analyzing a cross section of the electrode according to Example 1 with a scanning electron microscope (SEM).

FIG. 2B shows a result of analyzing a cross section of the electrode according to Comparative Example 1 with an SEM.

FIG. 3A shows an observation of the state of the electrode according to Example 1.

FIG. 3B shows an observation of the state of the electrode according to Comparative Example 1.

FIG. 4A shows an SEM-EDX line mapping result for a cross section of the electrode according to Example 1.

FIG. 4B shows an SEM-EDX line mapping result for a cross section of the electrode according to Comparative Example 1.

FIG. 5 shows the charge/discharge capacities of the half-cells according to Example 2 and Comparative Example 2.

FIG. 6 shows the rate performances of the half-cells according to Example 2 and Comparative Example 2.

DETAILED DESCRIPTION

The above objects, other objects, features and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals have been used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise", "have", etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be "on" other part, this includes not only the case where it is "directly on" the other part but also the case where there is another part in the middle thereof. Conversely, when a part of a layer, film, region, plate, etc. is said to be "under" other part, this includes not only the case where it is "directly under" the other part, but also the case where there is another part in the middle thereof.

Unless otherwise specified, since all numbers, values, and/or expressions expressing quantities of components, reaction conditions, polymer compositions and formulations used in the present specification are approximate values reflecting various uncertainties of the measurement that arise in obtaining these values among others in which these numbers are essentially different, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

FIG. 1 shows an all-solid-state battery according to one exemplary embodiment of the present disclosure. Referring to this, the all-solid-state battery may comprise a solid electrolyte layer 10 and a pair of electrodes 20, 20' disposed on two opposing surfaces of the solid electrolyte layer 10.

The solid electrolyte layer 10 interposed between the pair of electrodes 20, 20' may allow lithium ions to move between the electrode 20 and the electrode 20'.

The solid electrolyte layer 10 may include a sulfide-based solid electrolyte.

The sulfide-based solid electrolyte may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n are positive numbers, and Z is one of Ge, Zn, and Ga), $Li_2S$—$GeS_2$, $Li_2S$—$SiS_2$—$Li_3PO_4$, $Li_2S$—$SiS_2$-$Li_xMO_y$ (provided that x and y are positive numbers, and M is one of P, Si, Ge, B, Al, Ga, and In), $Li_{10}GeP_2S_{12}$, and the like.

The electrode 20 may comprise an electrode active material, a sulfide-based solid electrolyte, a conductive material, a binder, and the like.

The electrode active material may include a cathode active material or an anode active material.

The cathode active material is not particularly limited, but may be, for example, an oxide active material or a sulfide active material.

The oxide active material may include a rock salt layer-type active material such as $LiCoO_2$, $LiMnO_2$, $LiNiO_2$, $LiVO_2$, $Li_{1+x}Ni_{1/3}Co_{1/3}Mn_{1/3}O_2$, or the like, a spinel-type active material such as $LiMn_2O_4$, $Li(Ni_{0.5}Mn_{1.5})O_4$, or the like, a reverse spinel-type active material such as $LiNiVO_4$, $LiCoVO_4$, or the like, an olivine-type active material such as $LiFePO_4$, $LiMnPO_4$, $LiCoPO_4$, $LiNiPO_4$, or the like, a silicon-containing active material such as $Li_2FeSiO_4$, $Li_2MnSiO_4$, or the like, a rock salt layer-type active material in which a part of the transition metal is substituted with a dissimilar metal, such as $LiNi_{0.8}Co_{(0.2-x)}Al_xO_2$ ($0<x<0.2$), a spinel-type active material in which a part of the transition metal is substituted with a dissimilar metal, such as $Li_{1+x}Mn_{2-y}M_yO_4$ (M is at least one of Al, Mg, Co, Fe, Ni, and Zn, and $0<x+y<2$), or a lithium titanate such as $Li_4Ti_5O_{12}$ or the like.

The sulfide active material may include copper chevrel, iron sulfide, cobalt sulfide, nickel sulfide, or the like.

The anode active material is not particularly limited, but may include, for example, a carbon active material or a metal active material.

The carbon active material may include graphite such as mesocarbon microbeads (MCMB), highly-oriented pyrolytic graphite (HOPG), or the like, or amorphous carbon such as hard carbon, soft carbon, or the like.

The metal active material may include In, Al, Si, Sn, an alloy containing at least one of these elements, or the like.

The sulfide-based solid electrolyte may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n are positive numbers, and Z is one of Ge, Zn, and Ga), $Li_2S$—$GeS_2$, $Li_2S$—$SiS_2$—$Li_3PO_4$, $Li_2S$—$SiS_2$-$Li_xMO_y$ (provided that x and y are positive numbers, and M is one of P, Si, Ge, B, Al, Ga, and In), $Li_{10}GeP_2S_{12}$, and the like.

The conductive material is a configuration which forms an electron conduction path within the electrode. The conductive material may be a $sp^2$ carbon material such as carbon black, conductive graphite, ethylene black, carbon nanotube, or the like, or graphene.

The binder may include at least one selected from the group consisting of polyvinylidene fluoride (PVdF), poly(vinylidene fluoride-hexafluoropropylene) (PVdF-HFP), poly(vinylidene fluoride-trifluoroethylene) (PVdF-TrFE), poly(vinylidene fluoride-co-chlorotrifluoroethylene) (PVdF-CTFE), poly(vinylidene fluoride-hexafluoropropylene) (PVdF-HEP), and combinations thereof. The present disclosure relates to an all-solid-state battery comprising, as a binder, a fluorine-based polymer rather than a conventional rubber-based polymer.

The electrode 20 may be manufactured by a wet process. Specifically, the electrode 20 may be manufactured by preparing an electrode slurry including the electrode active material, the sulfide-based solid electrolyte, the conductive material, and a binder solution, applying it onto a substrate, and drying it.

The electrode slurry may include an amount of more than 0% by weight and about 30% by weight or less of the binder solution, an amount of more than 0% by weight and about 20% by weight or less of the sulfide-based solid electrolyte, an amount of more than 0% by weight and about 10% by weight or less of the conductive material, and the remaining amount of the electrode active material.

The binder solution may include a binder comprising the above-described fluorine-based polymer, a first solvent capable of dissolving the binder, and a second solvent miscible with the first solvent. Here, miscible means that the first solvent and the second solvent are capable of forming a homogeneous mixture.

The present disclosure is characterized by lowering the drying speed of the electrode slurry using the first solvent capable of dissolving the fluorine-based polymer with the second solvent having a higher boiling point and lower vapor pressure than those of the first solvent. Accordingly, it is possible to obtain the all-solid-state battery in which the binder comprising the fluorine-based polymer is uniformly distributed. If the drying speed of the electrode slurry is high, since the binder moves in the direction in which the solvent evaporates, an electrode in which the binder is uniformly distributed may not be obtained.

The above characteristics of the first solvent and the second solvent can be estimated from the Hansen solubility index. The Hansen solubility index is a relative measure between an organic solvent and a polymer or organic solvents obtained by indexing the dispersing power, intermolecular attraction, and hydrogen bonding force derived from intrinsic structure of the organic solvent and the polymer. The smaller the difference value ($R_a$) of the Hansen solubility index between specific objects, the greater the solubility and miscibility.

The difference value ($R_a$) of the Hansen solubility index can be calculated from Equation 1 below.

$$(R_a)^2 = 4(\delta_{d2}\_\delta_{d1})^2 + (\delta_{p2} - \delta_{p1}) + (\delta_{h2}\_\delta_{h1})^2 \quad \text{[Equation 1]}$$

$\delta_d$: The energy from dispersion forces between molecules $\delta_p$: The energy from dipolar intermolecular force between molecules $\delta_h$: The energy from hydrogen bonds between molecules $R_a$: The distance between Hansen parameters in Hansen space The Hansen solubility index difference value ($R_a$) between the fluorine-based polymer and the first solvent may be about 10 or less, or about 9 or less. If this is not satisfied, the binder solution cannot be prepared since the fluorine-based polymer does not dissolve in the first solvent. Further, the Hansen solubility index difference value ($R_a$) between the first solvent and the second solvent may be about 9 or less. If this is not satisfied, the distribution of the binder in the electrode may become nonuniform since the first solvent and the second solvent do not mix.

When the above conditions are satisfied, an electrode in which the binder is uniformly distributed can be obtained.

Meanwhile, the second solvent is characterized in that it has a higher boiling point and a lower vapor pressure than those of the first solvent.

A ratio (A/B) of a boiling point (A, [° C.]) of the first solvent at 760 mmHg to a vapor pressure (B, [mmHg]) of the first solvent at 25° C. may be about 1 or more and less than 90. Further, a ratio (C/D) of a boiling point (C, [° C.]) of the second solvent at 760 mmHg to a vapor pressure (D, [mmHg]) of the second solvent at 25° C. may be about 90 or more and less than 3,000. When the ratios of the boiling points and vapor pressures of the first solvent and the second solvent are the same as described above, the drying speed of the electrode slurry is sufficiently lowered so that an electrode in which the binder is uniformly distributed can be obtained.

The first solvent may include at least one selected from the group consisting of dibromomethane, ethyl acetate, methyl isobutyl ketone, ethyl formate, methyl acetate, methyl propionate, tetrahydrofuran, and combinations thereof.

The second solvent may include at least one selected from the group consisting of butyl butyrate, hexyl butyrate, benzyl acetate, pentyl butyrate, butyl benzoate, and combinations thereof.

Table 1 below describes the Hansen solubility indices of the fluorine-based polymer, the first solvent, and the second solvent.

TABLE 1

| Classification | | $\delta_d$ | $\delta_p$ | $\delta_h$ |
|---|---|---|---|---|
| Binder (Fluorine-based polymer) | PVdF-HFP | 17.2 | 12.5 | 8.2 |

TABLE 1-continued

| Classification | | $\delta_d$ | $\delta_p$ | $\delta_h$ |
|---|---|---|---|---|
| First solvent | Ethyl acetate | 15.8 | 5.3 | 7.2 |
| | Methyl isobutyl ketone | 15.3 | 6.1 | 4.1 |
| | Ethyl formate | 15.5 | 8.4 | 8.4 |
| | Methyl acetate | 15.5 | 7.2 | 7.6 |
| | Methyl propionate | 15.5 | 6.5 | 7.7 |
| | Tetrahydrofuran | 16.8 | 5.7 | 8 |
| Second solvent | Benzyl acetate | 18.3 | 5.7 | 6 |
| | Butyl butyrate | 15.6 | 2.9 | 5.6 |
| | Pentyl butyrate | 15.9 | 3.5 | 5.0 |
| | Hexyl butyrate | 16.0 | 3.2 | 4.7 |
| | Butyl benzoate | 18.3 | 2.9 | 5.5 |

Table 2 below describes the Hansen solubility index difference value ($R_a$) of a specific combination of the fluorine-based polymer and the first solvent.

TABLE 2

| Classification | | | $R_a$ |
|---|---|---|---|
| Binder-first solvent | PVdF-HFP | Ethyl acetate | 7.8 |
| | PVdF-HFP | Methyl isobutyl ketone | 8.5 |
| | PVdF-HFP | Ethyl formate | 5.3 |
| | PVdF-HFP | Methyl acetate | 6.3 |
| | PVdF-HFP | Methyl propionate | 6.9 |
| | PVdF-HFP | Tetrahydrofuran | 6.8 |

Table 3 below describes the Hansen solubility index difference value ($R_a$) of a specific combination of the first solvent and the second solvent. The first solvent is indicated on the horizontal axis, and the second solvent is indicated on the vertical axis.

TABLE 3

| | Ethyl acetate | Methyl isobutyl ketone | Ethyl formate | Methyl acetate | Methyl propionate | Tetrahy drofuran |
|---|---|---|---|---|---|---|
| Benzyl acetate | 5.2 | 6.3 | 6.7 | 6.0 | 5.9 | 3.6 |
| Butyl butyrate | 2.9 | 3.6 | 6.2 | 4.7 | 4.2 | 4.4 |
| Pentyl butyrate | 2.8 | 3.0 | 6.0 | 4.6 | 4.1 | 4.1 |
| Hexyl butyrate | 3.3 | 3.3 | 6.5 | 5.0 | 4.6 | 4.4 |
| Butyl benzoate | 5.8 | 6.9 | 8.4 | 7.4 | 7.0 | 4.8 |

The binder solution may include an amount of about more than 0% by weight and less than 20% by weight of the binder and the remaining amount of the first solvent and the second solvent.

Further, the binder solution may include an amount of more than 0% by volume and 50% by volume or less of the first solvent and an amount of about 50% by volume or more and less than 100% by volume of the second solvent based on the total volume of the first solvent and the second solvent. If the second solvent is included in an amount of less than 50% by volume, the effect of lowering vapor pressures of the binder solution and the electrode slurry is insignificant so that it may be difficult to obtain a uniform distribution of the binder in the electrode.

Hereinafter, the present disclosure will be described in more detail through specific Examples. The following Examples are merely illustrative to help the understanding of the present disclosure, and the scope of the present disclosure is not limited thereto.

Example 1 and Comparative Example 1

(Example 1) A binder solution was prepared by mixing PVdF-HFP as a binder, ethyl acetate as a first solvent, and hexyl butyrate as a second solvent. Graphite, which is an electrode active material, and a sulfide-based solid electrolyte were injected into the binder solution to obtain an electrode slurry. The electrode slurry was applied onto a substrate and dried to manufacture an electrode.

(Comparative Example 1) An electrode was manufactured in the same composition and manner as in Example 1 above except that the second solvent was not used. For reference, the exclusion of the second solvent was replaced with the first solvent.

FIG. 2A shows a result of analyzing a cross section of the electrode according to Example 1 with a scanning electron microscope (SEM). FIG. 2B shows a result of analyzing a cross section of the electrode according to Comparative Example 1 with an SEM.

FIG. 3A shows an observation of the state of the electrode according to Example 1. FIG. 3B shows an observation of the state of the electrode according to Comparative Example 1.

Referring to this, it can be seen that, when the first solvent is used alone as in Comparative Example 1, the adhesion between the substrate and the electrode is weakened, and thus cracks are generated in the electrode.

FIG. 4A shows an SEM-EDX line mapping result for a cross section of the electrode according to Example 1. FIG. 4B shows an SEM-EDX line mapping result for a cross section of the electrode according to Comparative Example 1. Through this, it is possible to know the fluorine content (F-content) in each electrode. Specifically, in FIGS. 4A and 4B, the normalized distance 100 is the surface of the electrode, and the normalized distance 0 is the portion where the electrode is in contact with the substrate. The results of measuring the fluorine content of each region by dividing the electrodes of Example 1 and Comparative Example 1 into a region (bottom) corresponding to half the thickness of the electrode from any one surface where the electrode is in contact with the substrate and the remaining region (top) are as shown in Table 4 below. That is, the bottom is a region from the Normalized distance 0 to the Normalized distance 50, and the top is a region from the Normalized distance 50 to the Normalized distance 100.

TABLE 4

| Classification | Fluorine content of the bottom (P) | Fluorine content of the top (Q) | Q/P |
|---|---|---|---|
| Example 1 | 4,254 | 4,845 | 1.14 |
| Comparative Example 1 | 5,486 | 8,862 | 1.62 |

Referring to Table 4, in Example 1, a ratio (Q/P) of the fluorine content (Q) included in the region corresponding to half the thickness thereof from one surface to the fluorine content (P) included in the remaining region is 1.14, which is smaller than the ratio (Q/P) of Comparative Example 1. This means that the fluorine-based polymer is more uniformly distributed in the electrode according to Example 1. The electrode according to the present disclosure is characterized in that the fluorine-based polymer is uniformly distributed by having a ratio (Q/P) of the fluorine content (Q) included in the region corresponding to half the thickness thereof from one surface to the fluorine content (P) included in the remaining region of 1.0 to 1.5. Since the binder is more distributed in one region corresponding to half the thickness of the electrode if the ratio (Q/P) exceeds 1.5, the uniformity of the binder may be degraded.

Example 2 and Comparative Example 2

(Example 2) A binder solution was prepared by mixing PVdF-HFP as a binder, ethyl acetate as a first solvent, and hexyl butyrate as a second solvent. An electrode slurry was obtained by injecting a nickel-cobalt-manganese (NCM)-based active material, a sulfide-based solid electrolyte, and a conductive material which are electrode active materials into the binder solution. The electrode slurry was applied onto a substrate and dried to manufacture an electrode. A half-cell comprising the electrode was manufactured.

(Comparative Example 2) A half-cell was manufactured in the same manner as in Example 2 except that nitrile butadiene rubber (NBR) was used as a binder.

FIG. 5 shows results of measuring the charge/discharge capacities of the half-cells according to Example 2 and Comparative Example 2. FIG. 6 shows results of measuring the rate performances of the half-cells according to Example 2 and Comparative Example 2. Referring to this, it can be seen that the half-cell according to Example 2 is excellent in both capacity and rate characteristics compared to Comparative Example 2 using the rubber-based binder.

Hereinabove, embodiments of the present disclosure have been described with reference to the accompanying drawings, but those with ordinary skill in the art to which the present disclosure pertains will understand that the present disclosure may be implemented in other specific forms without changing the technical spirit or essential features thereof. Therefore, it should be understood that the embodiments described above are illustrative in all respects and not restrictive.

What is claimed is:

1. A binder solution for an all-solid-state battery, comprising:

a binder including a fluorine-based polymer;

a first solvent; and a second solvent, wherein a Hansen solubility index difference value ($R_a$) between the fluorine-based polymer and the first solvent is about 10 or less, wherein a Hansen solubility index difference value ($R_a$) between the first solvent and the second solvent is about 9 or less, wherein a ratio (C/D) of a boiling point (C, [° C.]) of the second solvent at 760 mmHg to a vapor pressure (D, [mmHg]) of the second solvent at 25° C. is about 90 or more and less than about 3,000, and wherein the second solvent comprises at least one of butyl butyrate, hexyl butyrate, benzyl acetate, pentyl butyrate, butyl benzoate, or any combination thereof.

2. The binder solution of claim 1, wherein the binder includes at least one of polyvinylidene fluoride (PVdF), poly(vinylidene fluoride-hexafluoropropylene) (PVdF-HFP), poly(vinylidene fluoride-trifluoroethylene) (PVdF-TrFE), poly(vinylidene fluoride-co-chlorotrifluoroethylene) (PVdF-CTFE), or any combination thereof.

3. The binder solution of claim 1, wherein a ratio (A/B) of a boiling point (A, [° C.]) of the first solvent at 760 mmHg to a vapor pressure (B, [mmHg]) of the first solvent at 25° C. is about 1 or more and less than about 90.

4. The binder solution of claim 1, wherein the first solvent comprises at least one of dibromomethane, ethyl acetate, methyl isobutyl ketone, ethyl formate, methyl acetate, methyl propionate, tetrahydrofuran, or any combination thereof.

5. The binder solution of claim 1, wherein the binder comprises poly(vinylidene fluoride-hexafluoropropylene) (PVdF-HFP), the first solvent comprises ethyl acetate, and the second solvent comprises hexyl butyrate.

6. The binder solution of claim 1, wherein the binder solution includes the first solvent in an amount of more than 0% by volume and about 50% by volume or less and the second solvent in an amount of about 50% by volume or more and less than 100% by volume based on the total volume of the first solvent and the second solvent.

7. The binder solution of claim 1, wherein the binder solution comprises the binder in an amount of more than 0% by weight and less than about 20% by weight.

8. An all-solid-state battery comprising a solid electrolyte layer and a pair of electrodes disposed on two opposing surfaces of the solid electrolyte layer, wherein at least one of the electrodes comprises the binder solution of claim 1.

9. The all-solid-state battery of claim 8, wherein a ratio (Q/P) of a fluorine content (Q) in a region corresponding to half the thickness of the electrode from one surface thereof to a fluorine content (P) in the remaining region ranges from about 1.0 to about 1.5.

* * * * *